(12) United States Patent
Sato et al.

(10) Patent No.: US 12,047,672 B2
(45) Date of Patent: Jul. 23, 2024

(54) DISPLAY CONTROL APPARATUS, CONTROL METHOD THEREFOR, AND STORAGE MEDIUM

(71) Applicant: CANON KABUSHIKI KAISHA, Tokyo (JP)

(72) Inventors: Ayumi Sato, Kanagawa (JP); Akio Yoshikawa, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 65 days.

(21) Appl. No.: 18/058,196

(22) Filed: Nov. 22, 2022

(65) Prior Publication Data

US 2023/0164291 A1  May 25, 2023

(30) Foreign Application Priority Data

Nov. 25, 2021 (JP) ................. 2021-191537

(51) Int. Cl.
*H04N 23/63* (2023.01)
*H04N 5/262* (2006.01)
*H04N 5/272* (2006.01)
*H04N 5/91* (2006.01)

(52) U.S. Cl.
CPC ......... *H04N 23/631* (2023.01); *H04N 5/2628* (2013.01); *H04N 5/272* (2013.01); *H04N 5/91* (2013.01); *H04N 23/63* (2023.01); *H04N 23/632* (2023.01); *H04N 23/633* (2023.01)

(58) Field of Classification Search
CPC ...... H04N 5/2628; H04N 5/272; H04N 5/445; H04N 5/91; H04N 9/8205; H04N 23/63; H04N 23/631; H04N 23/632; H04N 23/633

See application file for complete search history.

(56) References Cited

U.S. PATENT DOCUMENTS

| 2004/0183934 A1* | 9/2004 | Tatamiya | H04N 1/00496 348/E5.025 |
| 2019/0260944 A1* | 8/2019 | Ogawa | H04N 23/65 |
| 2022/0264005 A1* | 8/2022 | Nomura | G02B 7/08 |

FOREIGN PATENT DOCUMENTS

JP       2014096778 A    5/2014

* cited by examiner

Primary Examiner — Lin Ye
Assistant Examiner — Chriss S Yoder, III
(74) Attorney, Agent, or Firm — Canon U.S.A., Inc. IP Division

(57) ABSTRACT

A display control apparatus includes a memory and at least one processor which function as a setting unit configured to make a superimposed recording setting for recording a first display element superimposed on a moving image captured by an image capturing unit, and a control unit configured to perform control to display the first display element superimposed on the moving image captured by the image capturing unit in the superimposed recording setting made by the setting unit, and to display the moving image captured by the image capturing unit without superimposing the first display element on the moving image after completion of the superimposed recording setting made by the setting unit.

19 Claims, 7 Drawing Sheets

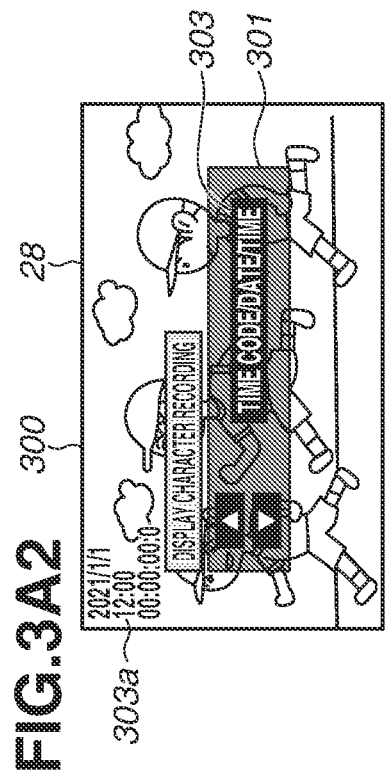
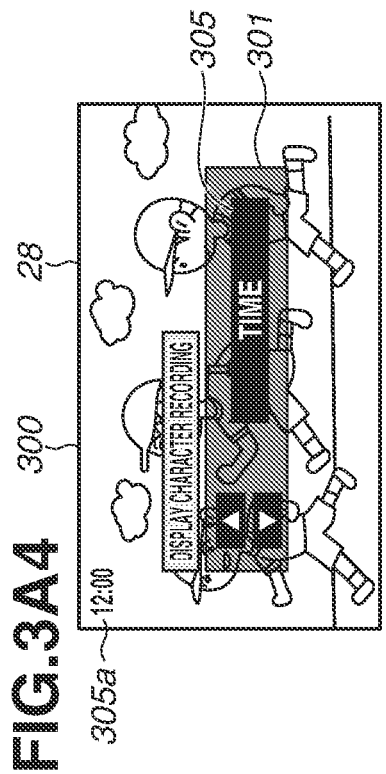
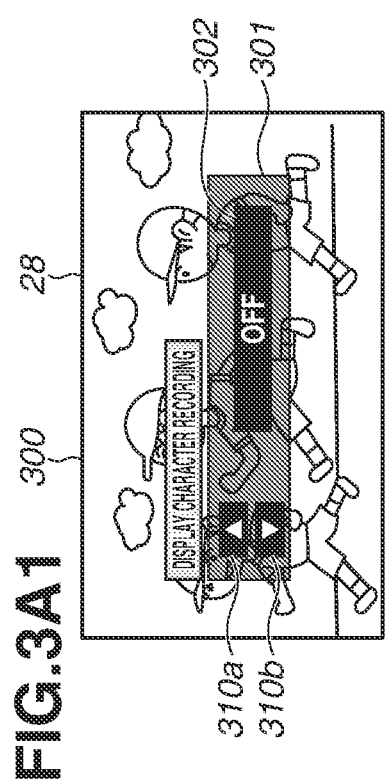
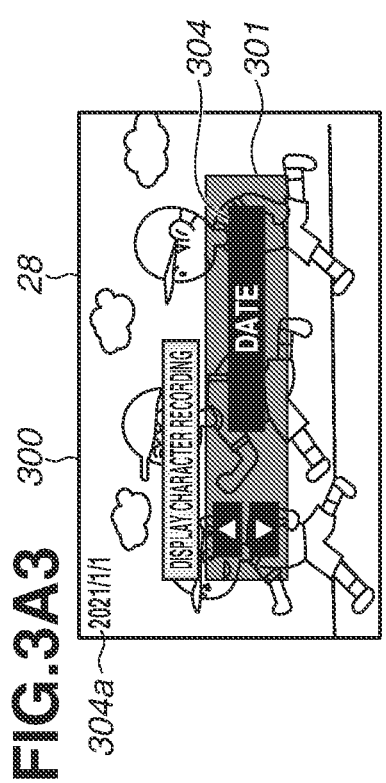
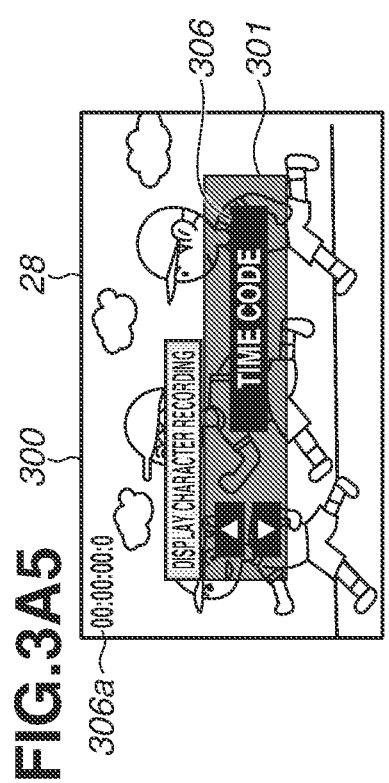

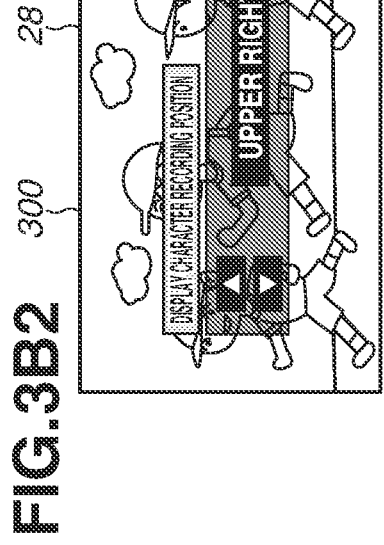
FIG.3B1
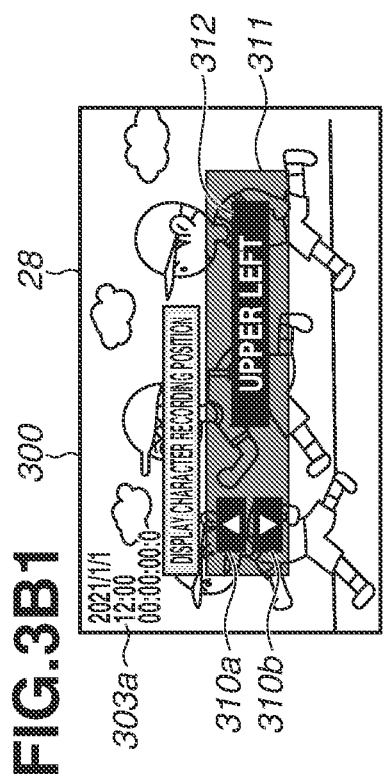
FIG.3B2
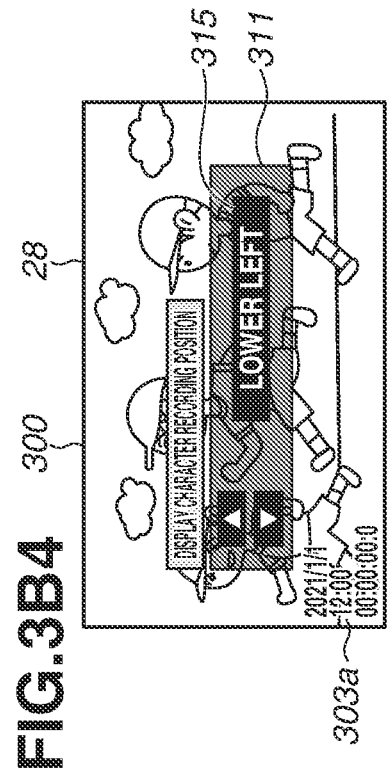
FIG.3B3
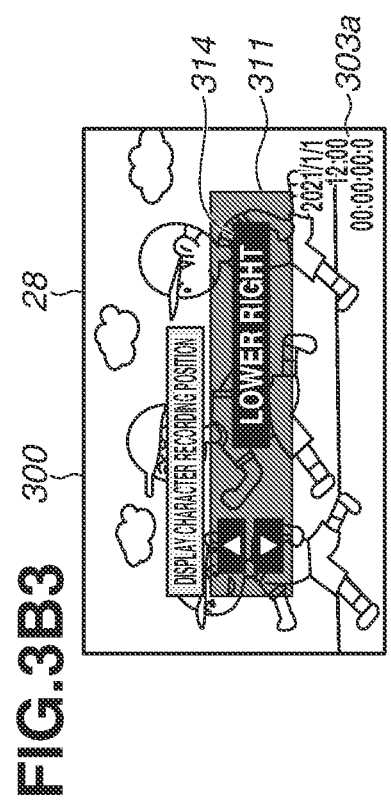
FIG.3B4

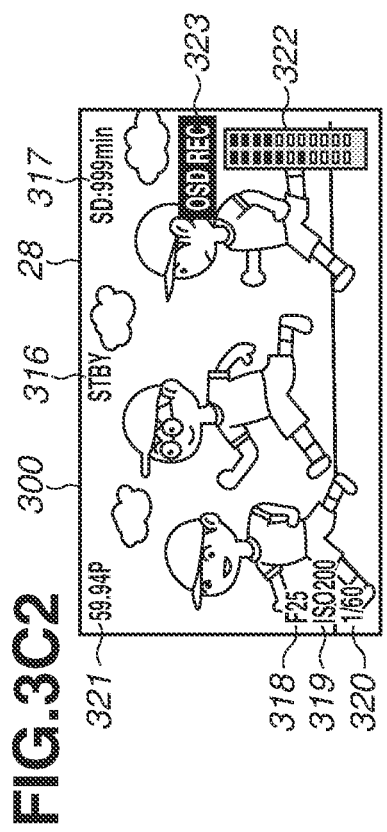
FIG.3C1
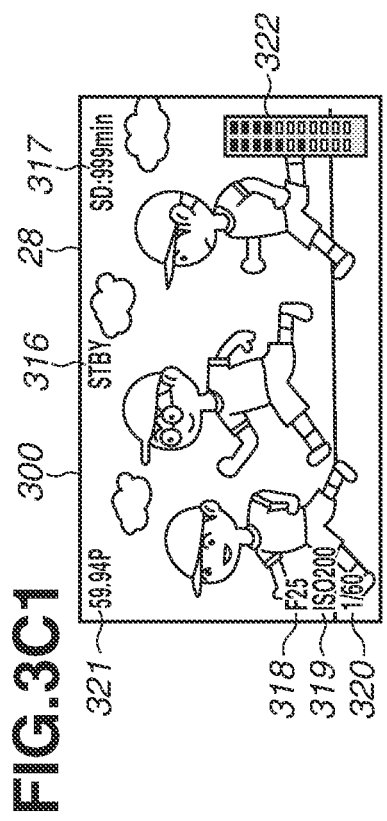
FIG.3C3
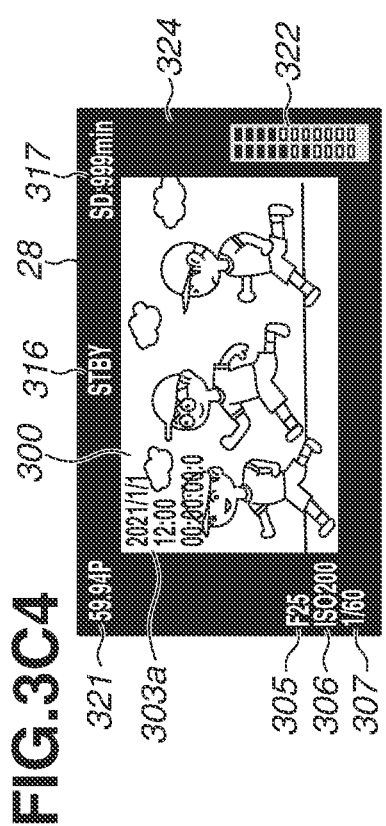
FIG.3C2
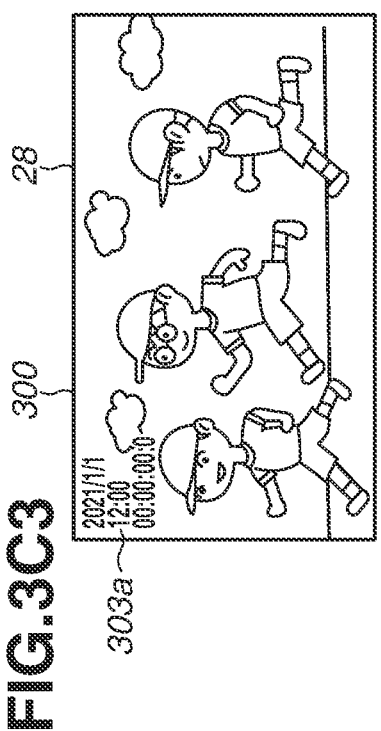
FIG.3C4

DISPLAY CONTROL APPARATUS, CONTROL METHOD THEREFOR, AND STORAGE MEDIUM

BACKGROUND

Field of the Disclosure

The present disclosure relates to a display control apparatus, a control method therefor, and a storage medium.

Description of the Related Art

There are known techniques for inserting watermarks in various types of digital content such as moving image files and still images these days. Japanese Patent Application Laid-Open No. 2014-96778 discusses a technique for determining the type of content after the content is obtained and inserting a watermark depending on the type of the content.

However, in the technique discussed in Japanese Patent Application Laid-Open No. 2014-96778, a user can recognize the position where a watermark is inserted after a moving image is recorded (stored). On the other hand, if the watermark to be displayed is superimposed on the moving image before or during recording of the moving image, the watermark overlaps other display elements such as image capturing settings used during image capturing. This may lead to deterioration in the visibility of the moving image.

SUMMARY

The present disclosure is directed to enabling a user to recognize display elements to be recorded with a moving image before recording of the moving image, and to preventing deterioration in the visibility of the moving image.

According to an aspect of the present disclosure, a display control apparatus includes a memory and at least one processor which function as a setting unit configured to make a superimposed recording setting for recording a first display element superimposed on a moving image captured by an image capturing unit, and a control unit configured to perform control to display the first display element superimposed on the moving image captured by the image capturing unit in the superimposed recording setting made by the setting unit, and to display the moving image captured by the image capturing unit without superimposing the first display element on the moving image after completion of the superimposed recording setting made by the setting unit.

Further features of the present disclosure will become apparent from the following description of exemplary embodiments with reference to the attached drawings.

BRIEF DESCRIPTION OF THE DRAWINGS

FIGS. 3A1 to 3C4 are descriptive views each illustrating an example of a display screen according to one or more aspects of the present disclosure.

DESCRIPTION OF THE EMBODIMENTS

Exemplary embodiments of the present disclosure will be described below with reference to the drawings.

Figure 1A:
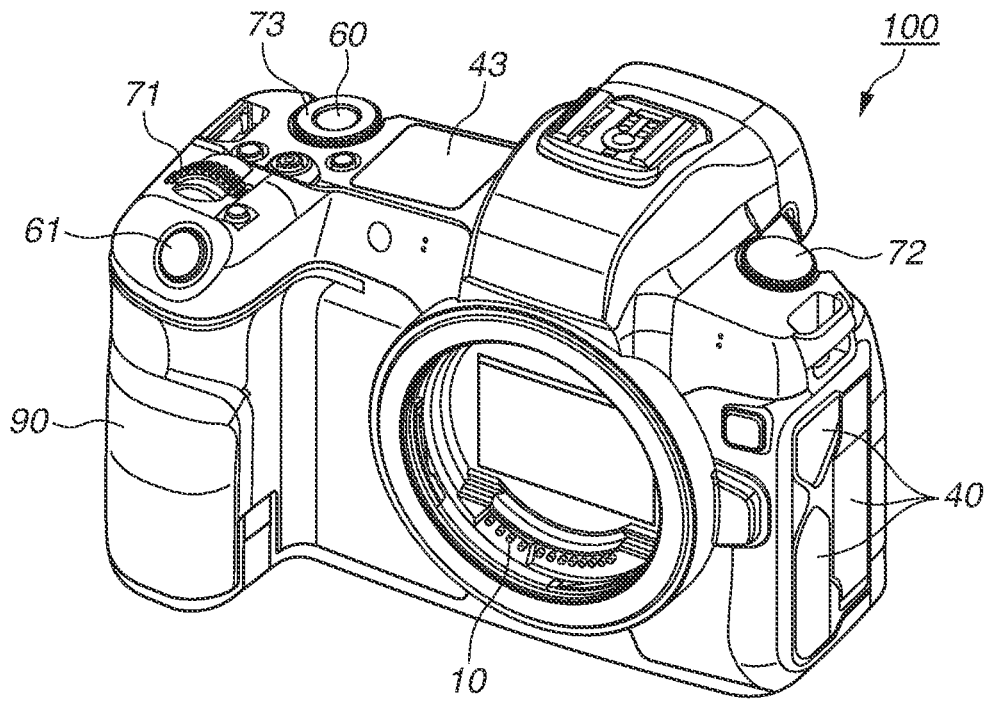
FIGS. 1A and 1B are external views of a digital camera according to one or more aspects of the present disclosure.
Figure 1B:
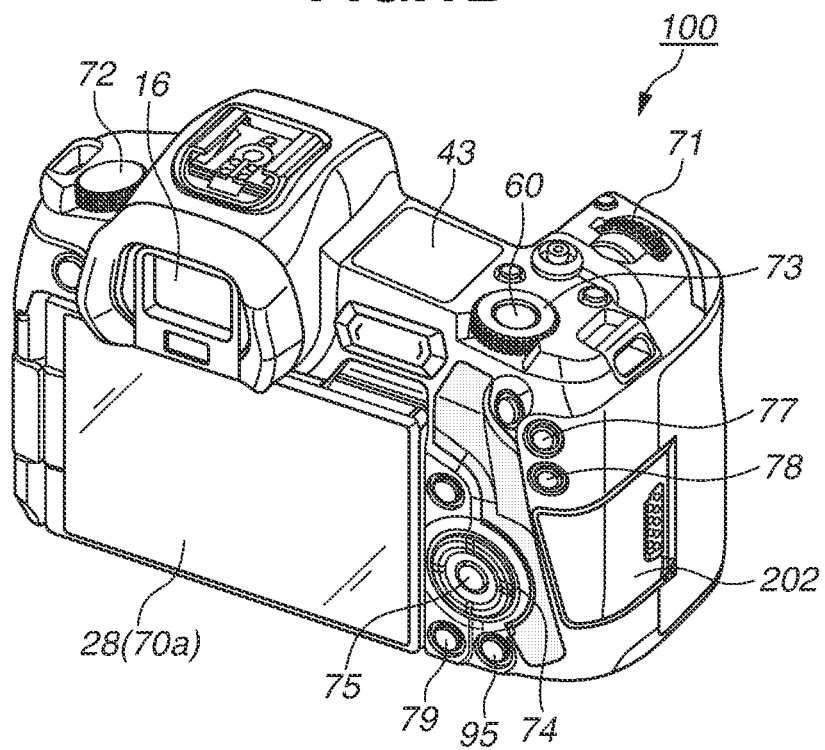

FIGS. 1A and 1B are external views each illustrating a digital camera 100 as an example of an apparatus according to an exemplary embodiment of the present disclosure. FIG. 1A is a front perspective view of the digital camera 100, and FIG. 1B is a back perspective view of the digital camera 100. As illustrated in FIG. 1B, a display unit 28 is a display unit that is configured to display images and various types of information and is provided on the back surface of the digital camera 100. While FIG. 1B illustrates an example where the display unit 28 is a display unit provided on the back surface of the digital camera 100, the configuration of the display unit 28 is not limited to this example. For example, the display unit 28 may be an external monitor, such as a liquid crystal display (LCD) panel or an organic electroluminescence (EL) panel, including an external storage device configured to store image files. The display unit 28 provided on the back surface of the digital camera 100 and a display unit (not illustrated) serving as an external monitor can be connected to the digital camera 100, and a video signal can be supplied to both or one of the display units.

A touch panel 70a is an operation member on which touch operations can be performed. The touch panel 70a is configured to detect a touch operation on a display surface (operation surface) of the display unit 28. An outer finder display unit 43 is a display unit that is provided on the top surface of the digital camera 100 and is configured to display various setting values such as a shutter speed and an aperture value.

A shutter button 61 is an operation unit to instruct image capturing. A still image capturing mode is used to instruct preparation for still image capturing and to instruct still image capturing. A moving image capturing mode is used to instruct start and stop of moving image capturing (recording). A mode selection switch 60 is an operation unit to switch various modes. A terminal cover 40 is a cover that protects a connector (not illustrated) for connecting the digital camera 100 with a connection cable for connecting an external apparatus. A main electronic dial 71 is a rotational operation member included in an operation unit 70. For example, setting values, such as a shutter speed and an aperture value, can be changed by turning the main electronic dial 71. A power switch 72 is an operation member to switch on and off a power supply to the digital camera 100. A sub-electronic dial 73 is a rotational operation member included in the operation unit 70. For example, movement of a selection frame and image feeding can be performed by turning the sub-electronic dial 73. A directional pad 74 is an operation member that is included in the operation unit 70 and includes buttons that can be pressed in four directions, respectively. Processing corresponding to a part pressed in one of the four directions can be performed. A SET button 75 is included in the operation unit 70 and functions as a push button that is mainly used to determine a selection item. A moving image button 77 is used to instruct start and stop of capturing (recording) a moving image. Pressing the shutter button 61 after pressing an auto exposure (AE) lock button 78 enables image capturing at a fixed autofocus (AF) position, or image capturing under a condition that AF cannot be used. A playback button 79 is an operation button that is included in the operation unit 70 and is used to switch between an image capturing mode and a playback mode. When the playback button 79 is pressed in the image capturing mode, the operation mode is switched to the playback mode, thereby enabling the display unit 28 to display the latest image out of images recorded on a recording medium 200. An assign button 95 is a button that is included in the operation unit 70 and is configured to assign other functions. In an initial state, the assign button 95 functions as a button to display a status screen. Other functions to be assigned to the assign button 95 include a function for changing settings or states of moving image capturing and playback, and a function for starting moving image capturing (recording). The function for displaying the status screen can be assigned to another assign button different from the assign button 95.

The status screen is a screen including a plurality of pages to display the settings or states of moving image capturing and playback, and the internal state of the digital camera 100.

A communication terminal 10 is a communication terminal for the digital camera 100 to communicate with a lens unit 150 (detachably mounted) to be described below. An eyepiece unit 16 is an eyepiece unit of an eyepiece finder (peep-type finder). A user can visually observe a video image displayed on an electronic viewfinder (EVF) 29 of an internal finder display unit through the eyepiece unit 16. A lid 202 is a lid for a slot in which the recording medium 200 or a battery is stored. A grip portion 90 is a holding portion in a shape that allows the user to easily grip the grip portion 90 with the user's right hand when the user holds the digital camera 100. The shutter button 61 and the main electronic dial 71 are at positions where the user can operate the shutter button 61 and the main electronic dial 71 with the index finger of the right hand while the user holds the digital camera 100 with the grip portion 90 gripped with the little finger, the ring finger, and the middle finger of the right hand. In the same state, the sub-electronic dial 73 is at a position where the user can operate the sub-electronic dial 73 with the thumb of the right hand.

Figure 2:
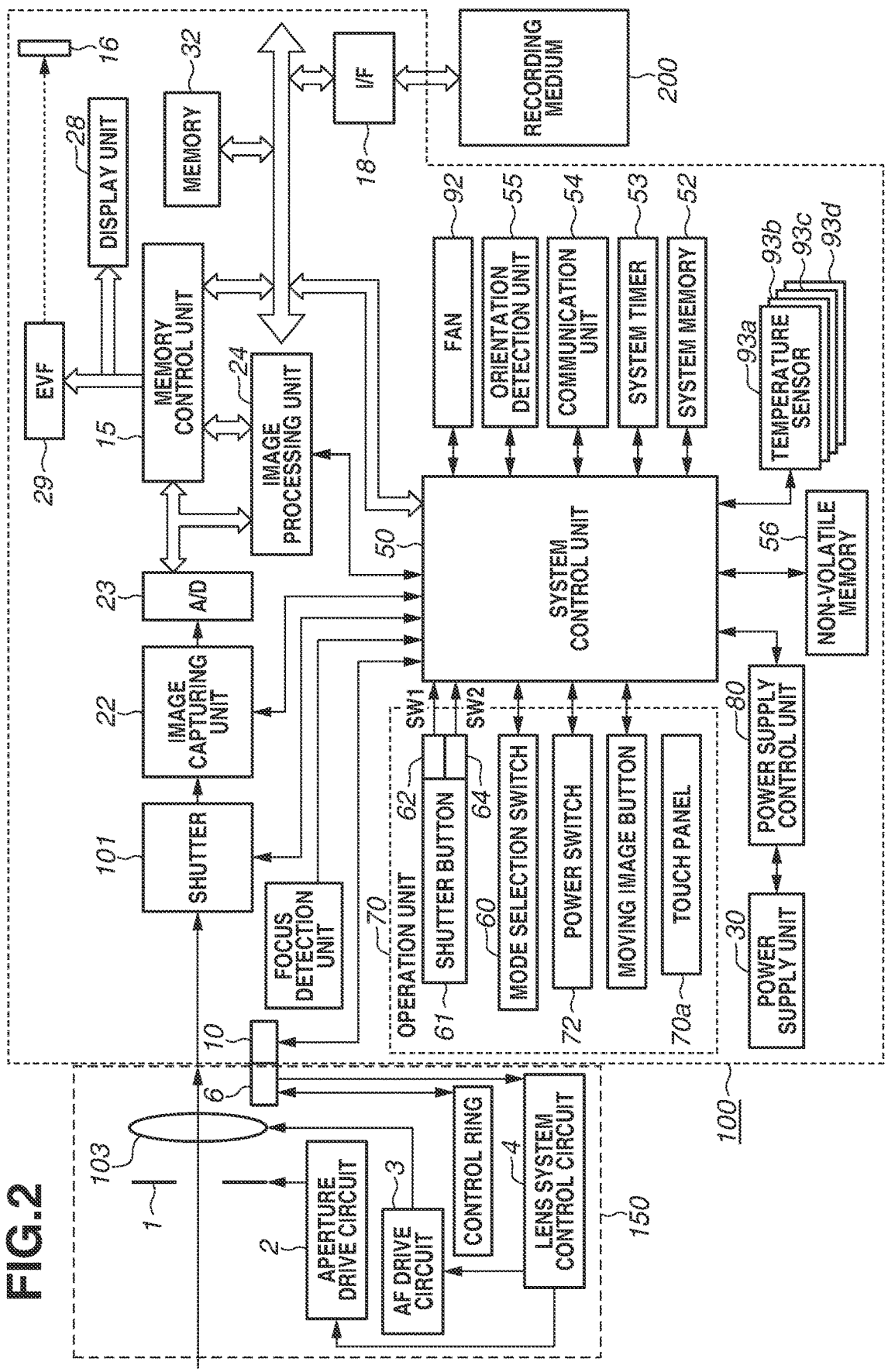
FIG. 2 is a block diagram illustrating a configuration example of the digital camera.

An air inlet port and an air outlet port are passages through which air passes to cool the main body of the digital camera 100. When a fan 92 illustrated in FIG. 2 is rotated, air flows into the air outlet port from the air inlet port, thereby enabling emission of heat from the main body. The main body is provided with temperature sensors 93 each configured to measure the temperature of a specific area of the main body. Depending on the measured temperature, the fan 92 can be stopped or the rotational speed can be changed. As described below, temperature state information is displayed on a screen based on external and internal temperatures of the main body acquired from the temperature sensors 93. A plurality of temperature sensors 93 and a plurality of fans 92 may be provided.

FIG. 2 is a block diagram illustrating a configuration example of the digital camera 100 according to the present exemplary embodiment. In the configuration example illustrated in FIG. 2, the lens unit 150 is a lens unit for an interchangeable image capturing lens to be incorporated therein. A lens 103 is generally composed of a plurality of lenses. However, for ease of illustration, the lens unit 103 is illustrated as a single lens. A communication terminal 6 is a communication terminal for the lens unit 150 to communicate with the digital camera 100. The lens unit 150 communicates with a system control unit 50 via the communication terminal 6 and the above-described communication terminal 10. A lens system control circuit 4 in the lens unit 150 controls an aperture 1 via an aperture drive circuit 2. After that, the lens 103 is shifted to perform focusing via an AF drive circuit 3.

A shutter 101 is a focal-plane shutter configured to freely control an exposure time for an image capturing unit 22 under the control of the system control unit 50.

The image capturing unit 22 is an image sensor that is configured to convert an optical image into an electric signal and is composed of a charge-coupled device (CCD), a complementary metal-oxide semiconductor (CMOS) device, or another type of device. An analog-to-digital (A/D) converter 23 is used to convert an analog signal output from the image capturing unit 22 into a digital signal.

An image processing unit 24 performs resizing processing and color conversion processing such as predetermined pixel interpolation and reduction on data output from the A/D converter 23 or data output from a memory control unit 15 to be described below. Further, the image processing unit 24 performs predetermined arithmetic processing using captured image data. The system control unit 50 performs exposure control and ranging control based on the arithmetic processing result obtained by the image processing unit 24. Thus, through-the-lens (TTL) AF processing, AE processing, and flash pre-emission (EF) processing are performed. Further, the image processing unit 24 performs predetermined arithmetic processing using captured image data and performs TTL auto white balance (AWB) processing based on calculation performed on the obtained arithmetic processing result.

The memory control unit 15 controls data exchange between the A/D converter 23, the image processing unit 24, and a memory 32. Data output from the A/D converter 23 is directly written into the memory 32 through the image processing unit 24 and the memory control unit 15, or through the memory control unit 15.

The memory 32 stores image data that is obtained by the image capturing unit 22 and is converted into digital data by the A/D converter 23, and also stores image data to be displayed on the display unit 28 and the EVF 29. The memory 32 has a storage capacity sufficient to store a predetermined number of still images, and moving images and sound for a predetermined period of time.

The memory 32 also functions as an image display memory (video memory). Image data for display written into the memory 32 is displayed on the display unit 28 and the EVF 29 through the memory control unit 15. The display unit 28 and the EVF 29 perform display images according to signals from the memory control unit 15 on a display such as a LCD or an organic EL display. Data that is obtained through A/D conversion by the A/D converter 23 and is accumulated in the memory 32 is sequentially transferred and displayed on the display unit 28 or the EVF 29, thereby making it possible to perform live view (LV) display. An image displayed in the live view display is hereinafter referred to as a live view image (LV image).

The image processing unit 24 compresses temporally continuous image data stored in the memory 32 in the format of MPEG or another file format, to thereby produce moving image data. The produced moving image data is stored in the memory 32 through the memory control unit 15, and is then multiplexed with audio data stored in the memory 32 and written into the recording medium 200 as a moving image file.

The outer finder display unit 43 displays various setting values for the digital camera 100. The various setting values include the shutter speed and the aperture value.

A non-volatile memory 56 is an electrically erasable and recordable memory. For example, an electrically erasable programmable read-only memory (EEPROM) is used. The non-volatile memory 56 stores constants for operation of the system control unit 50 and programs, for example. Programs described herein refer to programs for implementing various flowcharts to be described below according to the present exemplary embodiment.

The system control unit 50 is a control unit composed of at least one processor and/or at least one circuit, and controls the overall operation of the digital camera 100. Each processing according to the present exemplary embodiment to be described below is performed by running programs recorded on the above-described non-volatile memory 56. For example, a random access memory (RAM) is used as the system memory 52. Constants and variables for operation of the system control unit 50, and programs read out from the non-volatile memory 56 are loaded into the system memory 52. The system control unit 50 also performs display control by controlling the memory 32, the D/A converter 19, the display unit 28, and other units. The display control according to the present exemplary embodiment is an on-screen display (OSD) for image capturing settings and other content to be displayed on the display unit 28.

A system timer 53 is a clock unit that measures the time used for various control operations and measures the time of a built-in clock.

The mode selection switch 60, a first shutter switch 62, a second shutter switch 64, and the operation unit 70 are operation units for inputting various operation instructions to the system control unit 50. The mode selection switch 60 switches the operation mode of the system control unit 50 to a still image recording mode, the moving image capturing mode, the playback mode, or another mode. The still image recording mode includes an auto image capturing mode, an auto scene determination mode, a manual mode, an aperture priority mode (Av mode), a shutter speed priority mode (Tv mode), and a program AE mode. The still image recording mode also includes various scene modes for making image capturing settings for each image capturing scene, and a custom mode. The user can directly switch the operation mode to one of these modes using the mode selection switch 60. In some embodiments, the user temporarily switches the display screen to an image capturing mode list screen using the mode selection switch 60, and then selects one of the modes displayed on the screen and switches to the mode using other operation members. In other embodiments, the moving image capturing mode includes a plurality of modes.

The first shutter switch 62 is turned on in the middle of an operation of the shutter button 61 provided on the digital camera 100, that is, in a half-depressed state (image capturing preparation instruction), and produces a first shutter switch signal SW1. The first shutter switch signal SW1 is used to start an operation such as AF processing, AE processing, AWB processing, or EF processing.

The second shutter switch 64 is turned on with the operation of the shutter button 61 completed, that is, in a fully-depressed state (image capturing instruction), and produces a second shutter switch signal SW2. The second shutter switch signal SW2 causes the system control unit 50 to start a series of image capturing processing operations from reading of signals from the image capturing unit 22 to writing of image data into the recording medium 200.

Functions are assigned, as appropriate, to operation members of the operation unit 70 for scenes, for example, by selecting various function icons displayed on the display unit 28, and the operation members operate as various function buttons, respectively. Examples of the function buttons include an end button, a back button, an image feeding button, a jump button, a narrow-down button, and an attribute change button. For example, when the menu button is pressed, a menu screen on which various settings can be made is displayed on the display unit 28. The user can intuitively make various settings using the menu screen displayed on the display unit 28, as well as a four-direction button, including an upper part, a lower part, a left part, and a right part, and the SET button 75.

The operation unit 70 includes various operation members each serving as an input unit to receive operations from the user. The operation unit 70 includes a push button, a rotating dial, and a touch sensor, and includes at least operation members, such as the shutter button 61, the main electronic dial 71, the power switch 72, the sub-electronic dial 73, the directional pad 74, the SET button 75, the moving image button 77, the AE lock button 78, the playback button 79, and the assign button 95.

A power supply control unit 80 is composed of a battery detection circuit, a direct current (DC)-DC converter, a switch circuit for switching blocks to be energized, and other types of circuits, and detects whether a battery is put in position, the type of each battery, and a remaining battery capacity. The power supply control unit 80 controls the DC-DC converter based on the detection result and an instruction from the system control unit 50, and supplies a voltage to each unit including the recording medium 200 for a period of time. A power supply unit 30 includes a primary battery, such as an alkaline battery or a lithium battery, a secondary battery, such as a NiCd battery, a NiMH battery, or a Li battery, an alternating current (AC) adaptor.

A recording medium interface (I/F) 18 is an interface for communication with the recording medium 200, which is a memory card or a hard disk, for example. The recording medium 200 is a recording medium such as a memory card for recording captured images and moving image data, and includes a semiconductor memory and a magnetic disk.

A communication unit 54 is connected wirelessly or with a wired cable to transmit and receive video signals and audio signals. The communication unit 54 can also be connected to a wireless local area network (LAN) and the Internet. The communication unit 54 can also communicate with an external apparatus by Bluetooth® or Bluetooth® Low Energy. The communication unit 54 can transmit images (including a LV image) captured by the image capturing unit 22 and images recorded on the recording medium 200, and can receive images and various other types of information from an external apparatus.

An orientation detection unit 55 detects the orientation of the digital camera 100 with respect to the direction of gravity. Based on the orientation detected by the orientation detection unit 55, it can be determined whether an image captured by the image capturing unit 22 is an image captured by the digital camera 100 held horizontally, or an image captured by the digital camera 100 held vertically. The system control unit 50 can add orientation information depending on the orientation detected by the orientation detection unit 55 to an image file of an image captured by the image capturing unit 22, and also can record an image with the image rotated. Examples used as the orientation detection unit 55 can include an acceleration sensor and a gyroscope sensor. A motion (e.g., pan, tilt, lift, or still) of the digital camera 100 can also be detected using the acceleration sensor or the gyroscope sensor as the orientation detection unit 55.

The touch panel 70a configured to detect a touch on the display unit 28 is included as one example of the operation unit 70. The touch panel 70a and the display unit 28 can be integrally formed. For example, the touch panel 70a is configured such that the transmittance of light of the touch panel 70a does not hinder the display of the display unit 28. The touch panel 70a is attached to an upper layer of the display surface of the display unit 28. Input coordinates on the touch panel 70a are associated with display coordinates on the display screen of the display unit 28. This configuration makes it possible to provide a graphical user interface (GUI) as if the user could directly operate a screen displayed on the display unit 28. The system control unit 50 can detect the following operations on the touch panel 70a or the following states: the operation that a finger or a pen that has not touched the touch panel 70a first touches the touch panel 70a, i.e., the start of a touch (hereinafter referred to as "touch-down"), the state where a finger or a pen is touching the touch panel 70a (hereinafter referred to as "touch-on"), the state where a finger or a pen is moving while the finger or the pen continues touching the touch panel 70a (hereinafter referred to as "touch move"), the operation that a finger or a pen that has touched the touch panel 70a gets off the touch panel 70a, i.e., the end of a touch (hereinafter referred to as "touch-up"), and the state where nothing touches the touch panel 70a (hereinafter referred to as "touch-off").

If a touch-down is detected, a touch-on is simultaneously detected. After the touch-down, the touch-on typically continues being detected unless a touch-up is detected. A touch move is detected also in the state where the touch-on is detected. Even if the touch-on is detected, the touch move is not detected unless the touch position is moving. After the touch-up of all the fingers or the pen having touched the touch panel 70a is detected, a touch-off is detected.

Information about these operations and states and the position coordinates at which a finger or a pen touches the touch panel 70a is provided to the system control unit 50 via an internal bus. The system control unit 50 determines what touch operation is performed on the touch panel 70a based on the information provided to the system control unit 50. As for the touch move, the moving direction of the finger or the pen moving on the touch panel 70a with respect to each of the vertical and horizontal components on the touch panel 70a can be determined based on changes in the position coordinates. If a touch move performed by a predetermined distance or more is detected, the system control unit 50 determines that a slide operation is performed. The operation of quickly moving a finger by some distance while the finger continues touching the touch panel 70a, and then the finger gets off the touch panel 70a immediately after the quick movement is referred to as a "flick". In other words, a flick is the operation of quickly moving a finger on the touch panel 70a in a flipping manner. If a touch move performed by a predetermined distance or more at a predetermined speed or more is detected and a touch-up is detected in this state, the system control unit 50 can determine that a flick is performed (can determine that a flick is performed after a slide operation).

Further, a touch operation for simultaneously touching a plurality of places (e.g., two points) and bringing the touch positions close to each other is referred to as a "pinch-in", and a touch operation for putting the touch positions away from each other is referred to as a "pinch-out". The pinch-out and the pinch-in are collectively referred to as a "pinch operation" (or simply as "pinch").

The touch panel 70a may be a touch panel of any type from among various types including a resistive type, a capacitive type, a surface acoustic wave type, an infrared type, an electromagnetic induction type, an image recognition type, and a photosensor type. Depending on the type of the touch panel 70a, a method for detecting a touch operation based on a touch on the touch panel 70a, and a method for detecting a touch operation based on an approach of a finger or a pen to the touch panel 70a can be used. Any of such methods can be used.

Temperature sensors 93a to 93d are temperature sensors for measuring the housing surface and internal temperatures of the digital camera 100, and each function as a temperature acquisition unit included in the temperature sensors 93. The temperature sensor 93a is a temperature sensor provided near the image capturing unit 22 and measures the temperature near a device of the image capturing unit 22. The temperature sensor 93b is a temperature sensor provided near a connector protected by the terminal cover 40 and measures the temperature for calculating the housing surface temperature of the digital camera 100. This prevents the temperature of the housing surface from rising up to a certain high temperature (temperature lower than a restrictive temperature for device protection as described below, specifically, about 46° C.) to prevent the user who is gripping the grip portion 90 and continuously performs image capturing at the temperature from suffering a low-temperature burn. The temperature sensor 93c is a temperature sensor provided near the display unit 28 and measures the temperature near a device of the display unit 28. The temperature sensor 93d is a temperature sensor provided behind the lid 202 and measures the temperature near the recording medium 200 or a battery. If the temperature of each device rises (e.g., 80° C. or more), the devices cannot normally function, which leads to deterioration in image quality. To avoid this, the temperature measurements are performed. In the present exemplary embodiment, the four temperature sensors 93 are arranged near four devices, respectively. However, the number of sensors to be arranged and layout positions of the sensors are not limited to this example.

An operation of the digital camera 100 according to the present exemplary embodiment will be described below with reference to FIGS. 3A1 to 3C4 and FIG. 4. FIGS. 3A1 to 3C4 illustrate display examples of a screen to be displayed on the display unit 28 of the digital camera 100. FIG. 4 is a flowchart illustrating display control processing of the digital camera 100. The display control processing will be first described with reference to the flowchart of FIG. 4, and then display examples described with reference to FIGS. 3A1 to 3C4.

FIG. 4 is a flowchart illustrating control processing to be started when the digital camera 100 is activated (powered on) and a moving image recording mode is set in an image capturing standby state. This control processing is performed by the system control unit 50 loading programs stored in the non-volatile memory 56 into the system memory 52 and running the programs.

In step S401, the system control unit 50 determines whether a combined recording setting screen is displayed. If the combined recording setting screen is displayed on the display unit 28 (YES in step S401), the processing proceeds to step S402. If the combined recording setting screen is not displayed (NO in step S402), the processing proceeds to step S407. The term "combined recording" refers to recording of display elements, which are various types of information, combined with a moving image to be recorded when moving image recording is started by the user. Some users combine a moving image to be recorded with a character string (so-called time-stamp) including a date and time and a time code.

Beside a time-stamp, a mark called a watermark may be added to a moving image. Specifically, a user can combine a character string and other types of information that can be registered by the user as appropriate with a moving image the user captured. The character string and other types of information are used in identification of the user using the product name and the manufacturer of a material used in capturing the moving image, and the copyright. Information including all or at least one of the display elements that are a time code, a date, and time is referred to as a time-stamp.

In step S402, the system control unit 50 determines whether the currently selected setting item is "OFF". If the setting item is "OFF" (YES in step S402), the processing proceeds to step S403. If the setting item is not "OFF" (NO in step S402), the processing proceeds to step S404. Specifically, in step S402, it is determined that the setting item is "OFF" (YES in step S402) when the setting item "OFF" is selected or indicated by a cursor on the setting screen displayed on the display unit 28 in step S401. FIG. 3A1 illustrates a display example of the screen displayed in this case.

In step S403, the system control unit 50 does not display any display element. In other words, no display element superimposed on the LV image displayed on the display unit 28 is displayed. FIG. 3A1 illustrates a display example of the screen displayed in this case.

In step S404, the system control unit 50 causes the display unit 28 to display a preview of the display element corresponding to the setting item. Since it is determined that the setting item is not "OFF" (NO in step S402), it is obvious that a setting item other than the setting item "OFF" is selected on the setting screen. The display element corresponding to the currently-selected setting item is superimposed on the LV image to be displayed on the display unit 28. FIGS. 3A2 to 3A5 illustrate display examples of the screen displayed in this case.

In step S405, the system control unit 50 determines whether a combined position change instruction is issued. If the combined position change instruction is issued (YES in step S405), the processing proceeds to step S406. If the combined position change instruction is not issued (NO in step S405), the processing proceeds to step S419. The term "combined position" refers to the position of a display element to be recorded with a moving image. In the case of recording a moving image, the user can set the position where to combine the display element with the moving image in recording. In the present exemplary embodiment, for example, in a moving image capturing range, "upper left", "upper right", "lower left", or "lower right" can be set. FIGS. 3B1 to 3B4 illustrate display examples of the setting screen to be displayed in this case. For example, a combined position of display elements such as a watermark and a date and time to be recorded and combined with a moving image when the moving image is recorded and stored on the recording medium 200 can be set on the setting screen. In this step, the method for changing the combined recording position has been described. However, the size, tilt, and transparency can also be changed.

In step S406, the system control unit 50 changes the combined position to the changed position instructed in step S405.

As described above with reference to steps S401 to S406, in the present exemplary embodiment, the user can check the display of display elements to be recorded and combined with the moving image on the setting screen alone. In other words, even when the combined recording setting is made, the user cannot check which display element is to be combined where on the moving image in the image capturing standby state or during moving image recording and can check them when the moving image is played back after completion of moving image recording. For this reason, a preview of display elements is displayed on the setting screen to thereby enable the user to reliably check the display elements before moving image recording is started. This prevents the display elements from interfering with the recorded moving image since the user cannot recognize the position where the display elements are combined, which leads to a reduction in the number of recapturing images due to a failure in recording.

In step S407, the system control unit 50 determines whether an external display apparatus is connected. If the external display apparatus is connected (YES in step S407), the processing proceeds to step S408. If the external display apparatus is not connected (NO in step S407), the processing proceeds to step S411. The external display apparatus is connected via the communication unit 54. Examples of the external display apparatus that can be connected in this case include a High-Definition Multimedia Interface (HDMI®) and a serial digital interface (SDI).

Since it is determined that no combined recording setting screen is displayed in step S401 (NO in step S401), in step S408, the system control unit 50 determines whether the combined recording setting is "OFF" with reference to the non-volatile memory 56. If the combined recording setting is "OFF" (YES in step S408), the processing proceeds to step S410. If the combined recording setting is not "OFF" (NO in step S408), the processing proceeds to step S409.

In step S409, the system control unit 50 controls an internal display unit (display unit 28 in the present exemplary embodiment) so as not to display the display element, and controls a display unit of the external display apparatus to display the display element. Since it is determined that the external display apparatus is connected in step S407 (YES in step S407), it is obvious that the external display apparatus is connected. While it is determined that the combined recording setting is "OFF" (YES in step S408), the display area of the display unit of the external display apparatus is larger than the display area of the internal display unit (display unit 28) in many cases. Thus, the internal display unit follows the settings in combined recording, and the display element is superimposed on the LV image to be displayed, regardless of the settings in the combined recording setting. If the display unit of the external display apparatus is smaller than the internal display unit in the digital camera 100, the system control unit 50 does not control the display element to be superimposed on the LV image to be displayed, regardless of the settings in combined recording.

In step S410, the system control unit 50 controls the internal display unit and the external display unit not to display the display element. Since it is determined that the external display apparatus is connected (YES in step S407) and it is determined that the combined recording setting is not "OFF" (NO in step S408), the display element is not displayed on the display units. In this case, the display element is not displayed as described above, but the LV image, image capturing information, and the like are displayed.

Since it is determined that the external display apparatus is not connected in step S407 (NO in step S407), in step S411, the system control unit 50 determines whether the combined recording setting is "OFF", like in step S408. If the combined recording setting is "OFF" (YES in step S411), the processing proceeds to step S417. If the combined recording setting is not "OFF" (NO in step S411), the processing proceeds to step S412.

In step S412, the system control unit 50 determines whether an OSD information output setting, such as an image capturing setting, on the display unit is "ON". If the OSD information output setting is "ON" (YES in step S412), the processing proceeds to step S413. If the OSD information output setting is not "ON" (NO in step S412), the processing proceeds to step S418.

In step S413, the system control unit 50 determines whether OSD information (information about an image capturing setting or the like) is output (displayed) to the display unit. If the OSD information is output (YES in step S413), the processing proceeds to step S414. If the OSD information is not output (NO in step S413), the processing proceeds to step S418.

In step S414, the system control unit 50 determines whether a frame display setting on the display unit is "OFF. If the frame display setting is "OFF" (YES in step S414), the processing proceeds to step S415. If the frame display setting is not "OFF" (NO in step S414), the processing proceeds to step S418. The frame display setting is a setting for changing a captured image display area to be displayed on the display unit 28. If the frame display setting is "ON", the captured image is narrowed and displayed within the display unit 28, and the display element, such as an image capturing setting, is displayed on a margin area around the captured image.

In step S415, the system control unit 50 determines whether the OSD information to be output to the display unit 28 and the display element to be combined and recorded are superimposed. If the OSD information and the display element are superimposed (YES in step S415), the processing proceeds to step S416. If the OSD information and the display element are not superimposed (NO in step S415), the processing proceeds to step S418.

In step S416, the system control unit 50 displays an icon indicating that combined recording is set. FIG. 3C2 illustrates a display example of the screen to be displayed in this case. If combined recording is set, an icon 323 illustrated in FIG. 3C2 is displayed. The display of the icon 323 enables the user to recognize that the display element to be combined is superimposed on the recorded moving image when moving image recording is completed and the moving image is played back. If the display element to be combined and recorded with the moving image is actually superimposed on the moving image, the visibility of the LV image can deteriorate and the user can feel it bothersome. Thus, with the icon display, the display area for the LV image is wider. On the other hand, if the user cannot recognize that the display element is to be combined and recorded, the display element can be combined with the display element superimposed on an object when recording is stopped and the moving image is played back as described above. The icon 323 is displayed to reduce the inconvenience for the user.

In step S417, the system control unit 50 controls the internal display unit (display unit 28) not to display the display element.

In step S418, the system control unit 50 controls the internal display unit (display unit 28) to display the display element. This makes is possible to present the display element to be combined and recorded to the user, while ensuring the visibility on an image capturing screen.

In step S419, the system control unit 50 determines whether a moving image recording start instruction is issued. If the moving image recording start instruction is issued (YES in step S419), the processing proceeds to step S420. If the moving image recording start instruction is not issued (NO in step S419), the processing proceeds to step S423. Specifically, the moving image recording start instruction indicates pressing of the moving image button 77, or a touch operation on a touch icon (REC icon) displayed on the display unit 28 to start moving image recording. If an external output mode "ON" is set, it can be determined that the moving image recording start instruction is issued based on an operation on a moving image button or a moving image icon included in an apparatus, such as an external apparatus, that is configured to perform a remote control operation.

In step S420, the system control unit 50 starts moving image recording processing with or without combined display elements depending on the settings. In the recording processing, a moving image file is created in the recording medium 200 and the moving image captured by the image capturing unit 22 with the current settings is recorded on the recording medium 200. In this case, when the combined recording setting is made, the display element set for the moving image is combined and recorded. If the combined recording setting is not made, the moving image captured by the image capturing unit 22 is recorded.

In step S421, the system control unit 50 determines whether a moving image recording stop instruction is issued. If the moving image recording stop instruction is issued (YES in step S421), the processing proceeds to step S422. If the moving image recording stop instruction is not issued (NO in step S421), the processing returns to step S421. Specifically, the moving image recording stop instruction indicates a touch operation on a touch icon including a function for pressing the moving image button 77 or stopping moving image recording.

In step S422, the system control unit 50 stops moving image recording. When recording is stopped, close processing (e.g., assignment of attribute information) is performed on the moving image file created in the recording medium 200 or the external apparatus, and then the system control unit 50 transitions to the image capturing standby state.

In step S423, the system control unit 50 determines whether the processing is completed. If the processing is completed (YES in step S423), the control processing in the flowchart of FIG. 4 is terminated. If the processing is not completed (NO in step S423), the processing returns to step S401. The completion of the processing indicates, for example, turning off the power supply of the digital camera 100, or transition from the moving image mode.

While the present exemplary embodiment illustrates an example where pressing of the moving image button 77 or the touch operation on the touch icon is used as the moving image recording stop instruction in step S421, moving image recording can be stopped also when a mode switching operation, pressing of the playback button 79 (instruction for transition to playback mode processing), or an operation on the power switch 72 is performed. If the mode switching operation, pressing of the playback button 79, or the operation on the power switch 72 is performed, control processing corresponding to each operation is performed.

Examples of the screen to be displayed on the display unit 28 will be described with reference to FIGS. 3A1 to 3C4. FIGS. 3A1 to 3A5 illustrate display examples in a state where the combined recording setting screen is displayed. FIGS. 3B1 to 3B4 illustrate display examples in a state where the setting screen for a combined recording display position is displayed. FIGS. 3C1 to 3C4 illustrate display examples in the image capturing standby state.

FIGS. 3A1 to A5 illustrate display examples in a state where the combined recording setting screen is displayed, and a LV image 300 and a setting screen 301 are displayed on the display unit 28. FIGS. 3A1 to 3A5 illustrate display examples in a state where "upper left" is set as the combined position of the display element to be combined and recorded as described below.

FIG. 3A1 illustrates a display example of the screen to be displayed on the display unit 28 in step S403 illustrated in FIG. 4. FIG. 3A1 illustrates that the currently-selected setting item "OFF" (setting item 302) is displayed on the setting screen 301. The user issues an instruction for display items 310a or 310b to thereby change the setting item 302 to another item different from "OFF". In the example illustrated in FIG. 3A1, the setting item "OFF" is displayed (selected by the user), and thus there is no display element to be displayed on the LV image 300 in a preview.

FIGS. 3A2 to 3A5 illustrate display examples of the screen to be displayed on the display unit 28 in step S404. The display unit 28 displays the LV image 300, the setting screen 301, and the display element. In the examples illustrated in FIGS. 3A2 to 3A5, setting items 303 to 306 are displayed in the setting screen 301. When the user displays (selects) any one of the setting items 303 to 306, the display element to be superimposed on the LV image 300 and displayed in a preview is changed according to the display.

FIG. 3A2 illustrates that the setting item "time code/date/time" (setting item 303) is displayed in the setting screen 301. If the user issues an instruction for the display item 310b in the state illustrated in FIG. 3A1, the screen transitions to the display example illustrated in FIG. 3A2. In this case, when the setting item 303 is displayed, the preview display of the display element to be superimposed on the LV image 300 is changed. In this case, a display element 303a corresponding to the setting item 303 is displayed. The date, time, and time code of the display element 303a are displayed in this order from the top.

FIG. 3A3 illustrates that the setting item "date" (setting item 304) is displayed in the setting screen 301. If the user issues an instruction for the display item 310b in the state illustrated in FIG. 3A2, the screen transitions to the display example illustrated in FIG. 3A3. In this case, when the setting item 304 is displayed, the preview display of the display element to be superimposed on the LV image 300 is changed. In this case, a display element 304a (date) corresponding to the setting item 304 is displayed.

FIG. 3A4 illustrates that the setting item "time" (setting item 305) is displayed in the setting screen 301. If the user issues an instruction for the display item 310b in the state illustrated in FIG. 3A3, the screen transitions to the display example illustrated in FIG. 3A4. In this case, when the setting item 305 is displayed, the preview display of the display element to be superimposed on the LV image 300 is changed. In this case, a display element 305a (time) corresponding to the setting item 305 is displayed.

FIG. 3A5 illustrates that the setting item "time code" (setting item 306) is displayed in the setting screen 301. If the user issues an instruction for the display item 310b in the state illustrated in FIG. 3A4, the screen transitions to the display example illustrated in FIG. 3A1. In this case, when the setting item 306 is displayed, the preview display of the display element to be superimposed on the LV image 300 is changed. In this case, a display element 306a (time code) corresponding to the setting item 306 is displayed.

FIGS. 3A1 to 3A5 illustrate that "upper left" is set as the combined (displayed) position of the display element displayed in the preview corresponding to the setting item in the setting screen. However, if the set position is changed, the preview display position of the display element is changed according to the set position. The order of toggling the setting items is not limited to the above-described order, and the setting items are not limited to the above-described setting items.

FIGS. 3B1 to 3B4 illustrate display examples in a state where the setting screen for the combined recording display position is displayed, and the LV image 300 and a setting screen 311 are displayed on the display unit 28. FIGS. 3B1 to 3B4 illustrate display examples of the screen to be displayed when "time code/date/time" is set as the setting item for the display element to be combined and recorded as described above.

Figure 4A:
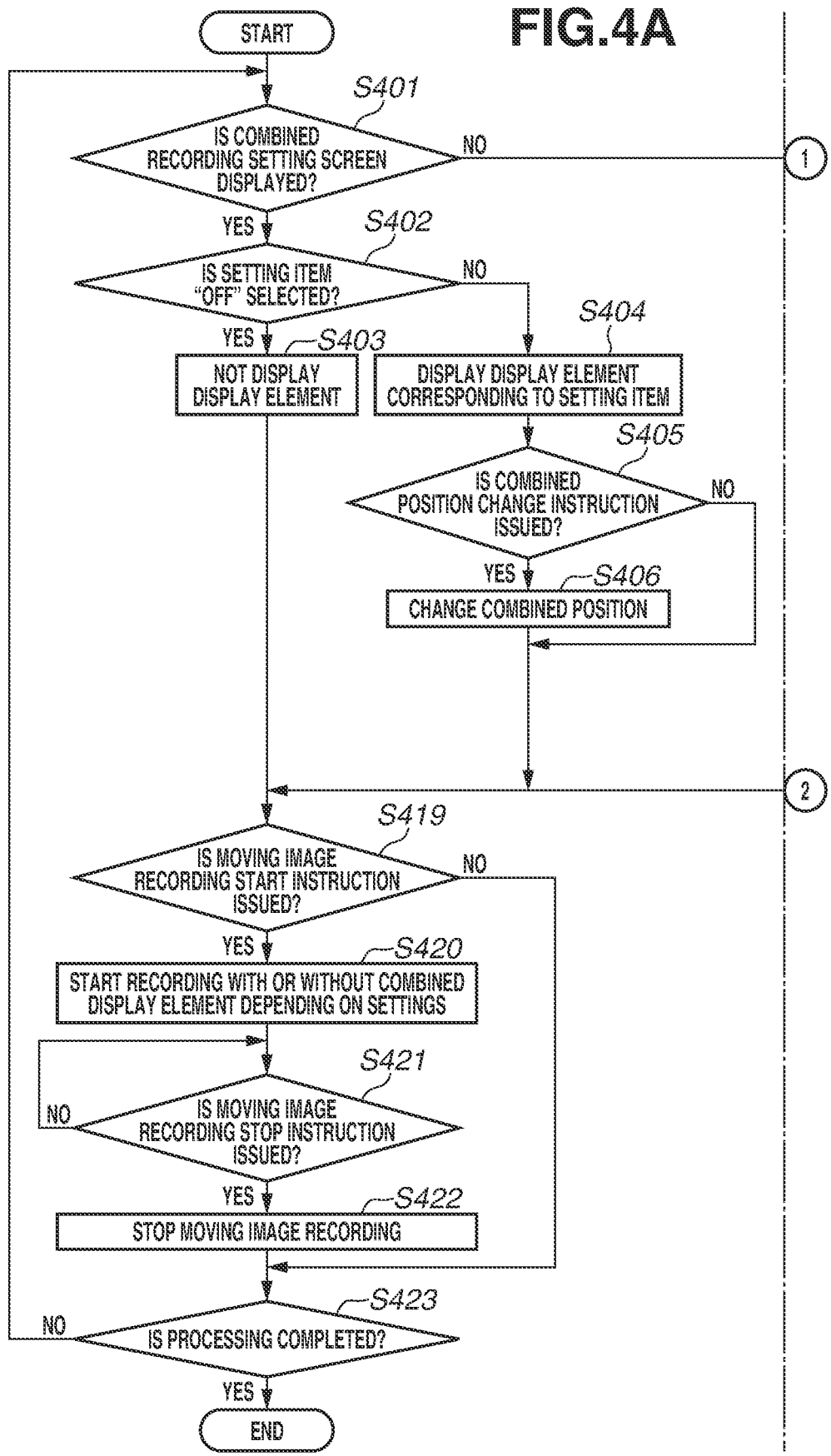
FIG. 4A to 4B is a flowchart illustrating an operation of the digital camera according to one or more aspects of the present disclosure.

FIG. 3B1 illustrates a display example of the screen to be displayed on the display unit 28 in step S405 illustrated in FIG. 4A. FIG. 3B1 illustrates that "upper left" (setting item 312) is displayed as the current setting item on the setting screen 311. The user issues an instruction for one of the display items 310a and 310b to thereby change the setting item 312 to another setting item different from "upper left". In the example illustrated in FIG. 3B1, the setting item "upper left" is displayed (selected by the user), and thus the preview of the display element 303a is displayed at the upper left position of the LV image 300.

FIG. 3B2 illustrates a display example of the screen to be displayed on the display unit 28 in step S405 illustrated in FIG. 4A. FIG. 3B2 illustrates that "upper right" (setting item 313) is set as the current setting item on the setting screen 311. If the user issues an instruction for the display item 310b in the state illustrated in FIG. 3B2, the screen transitions to the display example illustrated in FIG. 3B3. In the example illustrated in FIG. 3B2, the setting item "upper right" is displayed (selected by the user), and thus the preview of the display element 303a is displayed at the upper right position of the LV image 300.

FIG. 3B3 illustrates a display example of the screen to be displayed on the display unit 28 in step S405 illustrated in FIG. 4A. FIG. 3B3 illustrates that "lower right" (setting item 314) is displayed as the current setting item on the setting screen 311. If the user issues an instruction for the display item 310b in the state illustrated in FIG. 3B3, the screen transitions to the display example illustrated in FIG. 3B4. In the example illustrated in FIG. 3B3, the setting item "lower right" is displayed (selected by the user), and thus the preview of the display element 303a is displayed at the lower right position of the LV image 300.

FIG. 3B4 illustrates a display example of the screen to be displayed on the display unit 28 in step S405 illustrated in FIG. 4A. FIG. 3B4 illustrates that "lower left" (setting item 315) is displayed as the current setting item on the setting screen 311. If the user issues an instruction for the display item 310b in the state illustrated in FIG. 3B4, the screen transitions to the display example illustrated in FIG. 3B1. In the example illustrated in FIG. 3B4, the setting item "lower left" is displayed (selected by the user), and thus the display element 303a is displayed at the lower left position of the LV image 300.

FIGS. 3C1 to 3C4 illustrate display examples in the image capturing standby state, and the LV image 300 is displayed on the display unit 28.

Figure 4B:
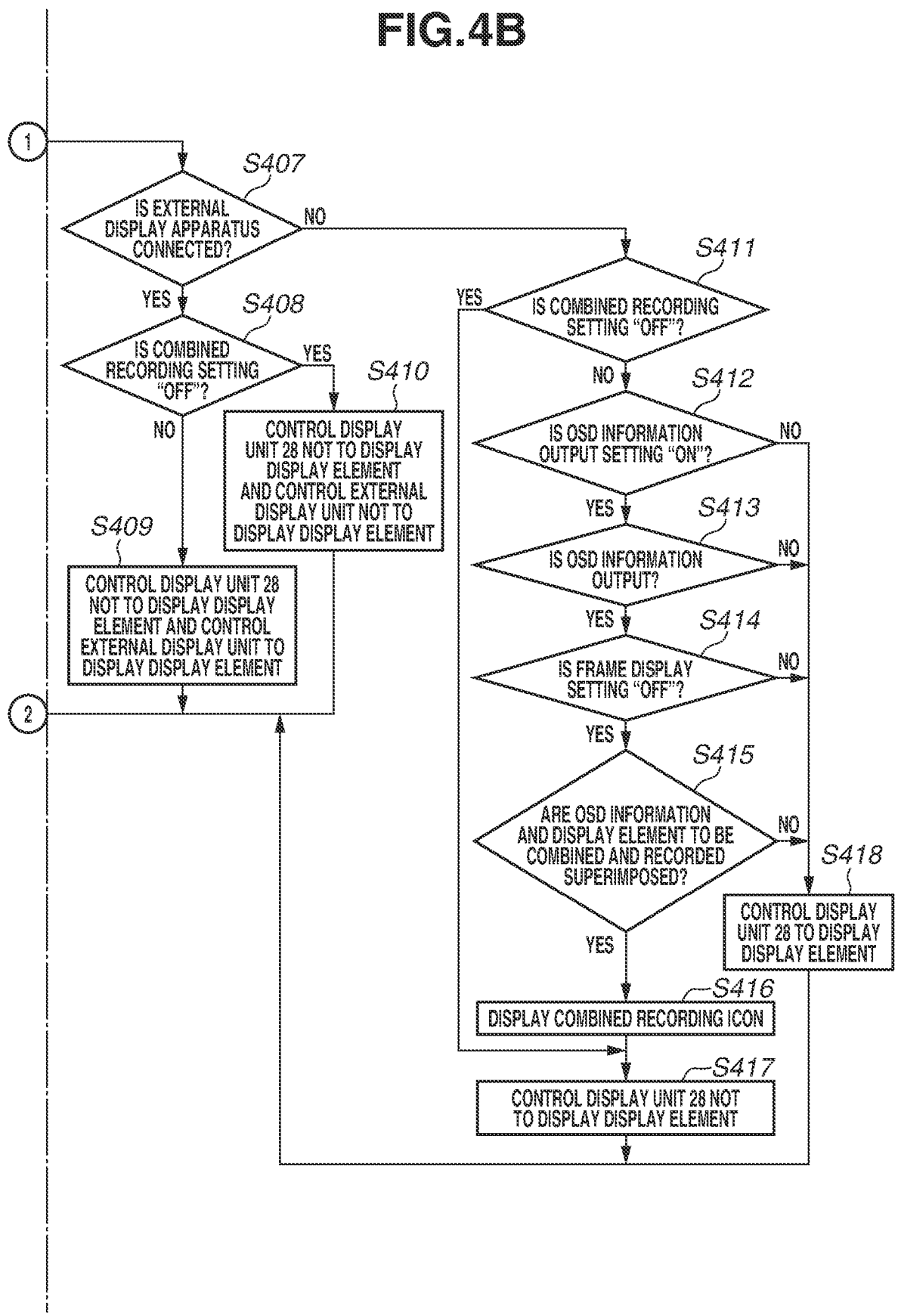

FIG. 3C1 illustrates a display example in step S417 after it is determined that the combined recording setting is "OFF" (YES in step S411) in FIG. 4B. A recording state 316, a recordable period 317, an F-value 318, an International Organization for Standardization (ISO) sensitivity 319, a shutter speed 320, a frame rate 321, and an audio level meter 322 are superimposed on the LV image 300 to be displayed on the display unit 28. In this case, the display element to be superimposed on the LV image is not displayed.

FIG. 3C2 illustrates a display example when steps 416 and 417 are carried out after it is determined that the combined recording setting is not "OFF" (NO in step S411)

and all the determination results in steps S412 to S415 indicate "YES" in FIG. 4B. The recording state 316, the recordable period 317, the F-value 318, the ISO sensitivity 319, the shutter speed 320, the frame rate 321, the audio level meter 322, and the combined recording setting icon 323 are superimposed on the LV image 300 to be displayed on the display unit 28. In this case, the display element to be superimposed on the LV image is not displayed. The combined recording setting icon 323 is displayed at a position different from the combined position of the display element.

FIG. 3C3 illustrates a display example of the screen to be displayed in step S418 illustrated in FIG. 4B. The display element 303a to be superimposed on the LV image 300 is displayed on the display unit 28. FIG. 3C3 illustrates a display example of the screen to be displayed when the determination result in any one of steps S412 to S415 indicates "NO". If the determination result in any one of steps S412 to S415 indicates "NO", OSD information, such as an image capturing setting, is not displayed on the LV image 300. Accordingly, even when the display element 303a is superimposed on the LV image 300 to be displayed, the user can fully check the LV image 300.

FIG. 3C4 is a modified example of the display examples illustrated in FIGS. 3C1 to 3C3, and illustrates a display example when the frame display setting is "ON". In the example illustrated in FIG. 3C4, the frame display setting is "ON", and thus a black area 324 is provided around the LV image 300. Thus, the LV image 300 is displayed in a size that is slightly smaller than that when the area 324 is not provided. However, the OSD information (image capturing settings including the recording state 316, the recordable period 317, the F-value 318, the ISO sensitivity 319, the shutter speed 320, the frame rate 321, and the audio level meter 322), excluding the display element, is displayed on the area 324. This enables the user to visually observe that image capturing information alone is displayed as information to be displayed on the area 324 and the display element 303a alone is combined and recorded with the moving image. In other words, the user can recognize the display element to be combined and recorded with the moving image in such a manner that the display element can be distinguished from the information to be displayed, thereby preventing the user from erroneously recognizing that the information to be displayed is also combined and recorded with the moving image. The display of the information (including the recording state 316, the recordable period 317, the F-value 318, the ISO sensitivity 319, the shutter speed 320, the frame rate 321, and the audio level meter 322) is displayed on the area 324 can enhance the visibility of the LV image 300.

In the case of playing back the moving image combined with the display element in the playback mode, the display example illustrated in FIG. 3C3 is displayed.

The above-described control processing according to the present exemplary embodiment makes it possible to clearly indicate that a display element is to be combined with a captured image without impairing the visibility of other display elements, such as image capturing settings, during image capturing. The display element to be combined and recorded with the captured image is superimposed on the captured image to be displayed during setting, thereby enabling the user to preliminarily recognize the display element to be combined and recorded with the captured image during image capturing. Furthermore, the deterioration in the visibility of a moving image after image capturing due to the display element superimposed and recorded after image capturing, or the inconvenience for the user to recapture an image when the user records the display element at an unintended position can be reduced.

The above-described various control operations that are assumed to be performed by the system control unit 50 may be implemented by one piece of hardware, or the overall control processing of the apparatus may be shared by a plurality of pieces of hardware (e.g. a plurality of processors or circuits).

While the present disclosure is described above based on the exemplary embodiments, the present disclosure is not limited to these specific exemplary embodiments. Various modifications within the scope of the disclosure are also included in the present disclosure. Further, the above-described exemplary embodiments are merely exemplary embodiments of the present disclosure, and the exemplary embodiments can be combined as appropriate.

The present disclosure is not limited to the main body of an image capturing apparatus, but is also applicable to a control apparatus that communicates with an image capturing apparatus (including a network camera) via wired or wireless communication and remotely controls the image capturing apparatus. Examples of the control apparatus that remotely controls the image capturing apparatus include a smartphone, a tablet personal computer (PC), and a desktop PC. The control apparatus issues commands to cause the image capturing apparatus to perform various operations and settings based on operations performed by the control apparatus or processing performed by the control apparatus, thereby making it possible to remotely control the image capturing apparatus. A LV image captured by the image capturing apparatus can be received via wired or wireless communication and the LV image can be displayed on the control apparatus. The above-described various control operations that are assumed to be performed by the system control unit 50 may be performed by one piece of hardware, or the overall control processing of the apparatus may be shared by a plurality of pieces of hardware (e.g., a plurality of processors or circuits).

While the present disclosure is described in detail above based on the exemplary embodiments, the present disclosure is not limited to these specific exemplary embodiments. Various modifications within the scope of the disclosure are also included in the present disclosure. Further, the above-described exemplary embodiments are merely exemplary embodiments of the present disclosure, and the exemplary embodiments can be combined as appropriate.

While the above-described exemplary embodiments illustrate an example where the present disclosure is applied to a digital camera, the present disclosure is not limited to this example. The present disclosure can be applied to any electronic apparatus, as long as the electronic apparatus is configured to perform moving image recording. Specifically, the present disclosure can be applied to a PC, a personal digital assistant (PDA), a mobile phone terminal, a portable image viewer, a printer apparatus including a display, a digital photo frame, a music player, a game console, an electronic book reader, and the like.

The present disclosure is not limited to the main body of the image capturing apparatus, but is also applicable to a control apparatus that communicates with the image capturing apparatus (including a network camera) via wired or wireless communication and remotely controls the image capturing apparatus. Examples of the control apparatus that remotely controls the image capturing apparatus include a smartphone, a tablet PC, and a desktop PC. The control apparatus issues commands to cause the image capturing apparatus to perform various operations and settings based on an operation performed by the control apparatus or processing performed by the control apparatus, thereby making it possible to remotely control the image capturing apparatus. A LV image captured by the image capturing apparatus can be received via wired or wireless communication and the LV image can be displayed on the control apparatus.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-191537, filed Nov. 25, 2021, which is hereby incorporated by reference herein in its entirety.

What is claimed is:

1. A display control apparatus comprising:
a memory and at least one processor which function as:
a setting unit configured to make a superimposed recording setting for recording a first display element superimposed on a moving image captured by an image capturing unit; and
a control unit configured to perform control to display the first display element superimposed on the moving image captured by the image capturing unit in the superimposed recording setting made by the setting unit, and to display the moving image captured by the image capturing unit without superimposing the first display element on the moving image after completion of the superimposed recording setting made by the setting unit.

2. The display control apparatus according to claim 1, wherein the control unit performs control to display the first display element superimposed at a superimposed position where the first display element is superimposed on the moving image to be recorded in the superimposed recording setting made by the setting unit, and
wherein after completion of the superimposed recording setting made by the setting unit, the control unit performs control to complete the display of the first display element superimposed on the moving image and to display a second display element superimposed on the moving image captured by the image capturing unit at a superimposed position different from the superimposed position of the first display element, the second display element indicating a setting for recording the first display element superimposed on the moving image.

3. The display control apparatus according to claim 2, wherein the second display element is an icon indicating the setting for recording the first display element superimposed on the moving image.

4. The display control apparatus according to claim 2, wherein a display area of the second display element is smaller than a display area of the first display element.

5. The display control apparatus according to claim 2, wherein with the setting unit that has made a setting for not recording the first display element superimposed on the moving image, the control unit performs control not to display the second display element after completion of the superimposed recording setting made by the setting unit.

6. The display control apparatus according to claim 2, wherein even in a case where the setting for recording the first display element superimposed on the moving image is selected in the superimposed recording setting made by the setting unit, the control unit performs control to display the second display element after completion of the superimposed recording setting made by the setting unit without displaying the second display element.

7. The display control apparatus according to claim 1,
wherein the setting unit is configured to select a superimposed position of the first display element in the superimposed recording setting, and
wherein in the superimposed recording setting made by the setting unit, the control unit performs control to display the first display element superimposed on the moving image at a position corresponding to the superimposed position selected in the superimposed recording setting and not to display the first display element after completion of the superimposed recording setting made by the setting unit.

8. The display control apparatus according to claim 1,
wherein in the superimposed recording setting made by the setting unit, a superimposed recording setting screen superimposed on the moving image captured by the image capturing unit is displayed, and
wherein the control unit performs control to display the first display element superimposed on the moving image captured by the image capturing unit during the display of the superimposed recording setting screen, and with the superimposed recording setting screen not displayed, the control unit performs control not to display the first display element to be superimposed on the moving image.

9. The display control apparatus according to claim 1,
wherein in the superimposed recording setting, the setting unit is configured to select a type of display element to be recorded and superimposed on the moving image captured by the image capturing unit, and wherein in the superimposed recording setting, the control unit performs control to display a display element corresponding to the type of display element selected in the superimposed recording setting as the first display element, the display element being superimposed on the moving image captured by the image capturing unit.

10. The display control apparatus according to claim 9, wherein the type of display element to be selected in the superimposed recording setting includes at least a time code, a date, and time.

11. The display control apparatus according to claim 1, wherein the first display element includes at least one of a time code, a date, or time.

12. The display control apparatus according to claim 1, wherein in a case where image capturing information different from the first display element is not displayed with the image capturing information superimposed on the moving image captured by the image capturing unit after completion of the setting by the setting unit, the control unit performs control to display the first display element superimposed on the moving image captured by the image capturing unit, and in a case where image capturing information different from the first display element is displayed with the image capturing information superimposed on the moving image captured by the image capturing unit, the control unit performs control not to display the first display element.

13. The display control apparatus according to claim 1, wherein in a case where a display position of image capturing information different from the first display element does not overlap a display position of the first display element on the moving image after completion of the setting by the setting unit, the control unit performs control to display the first display element superimposed on the moving image captured by the image capturing unit, and in a case where the display position of image capturing information different from the first display element overlaps the display position of the first display element on the moving image, the control unit performs control not to display the first display element.

14. The display control apparatus according to claim 1, wherein the memory and at least one processor further function as a recording unit configured to record the moving image captured by the image capturing unit, and wherein with the setting unit that has made the setting for recording the first display element superimposed on the moving image, the control unit performs control not to display the first display element during the recording, and the recording unit records the first display element superimposed on the moving image captured by the image capturing unit.

15. The display control apparatus according to claim 1, further comprising:
a display unit; and
a connection unit configured to connect an external display unit different from the display unit,
wherein with the control unit connected to the external display unit, the control unit performs control to display the first display element superimposed on an image captured by the image capturing unit on the external display unit without displaying the first display element on the display unit after completion of the superimposed recording setting made by the setting unit.

16. The display control apparatus according to claim 1, further comprising:
the image capturing unit; and
an instruction unit configured to give an instruct to record the moving image captured by the image capturing unit.

17. The display control apparatus according to claim 1, wherein the control unit performs control to display the first display element superimposed on a live view image captured by the image capturing unit in the superimposed recording setting made by the setting unit, and
wherein after completion of the superimposed recording setting made by the setting unit, the control unit performs control to display the live view image captured by the image captured unit without superimposing the first display element.

18. A control method for a display control apparatus, comprising:
making a superimposed recording setting for recording a first display element superimposed on a moving image captured by an image capturing unit; and
performing control to display the first display element superimposed on the moving image captured by the image capturing unit in the superimposed recording setting, and to display the moving image captured by the image capturing unit without superimposing the first display element on the moving image captured by the image capturing unit after completion of the superimposed recording setting.

19. A non-transitory computer-readable storage medium storing a program for causing a computer to execute a control method for a display control apparatus, the method comprising:
making a superimposed recording setting for recording a first display element superimposed on a moving image captured by an image capturing unit; and
performing control to display the first display element superimposed on the moving image captured by the image capturing unit in the superimposed recording setting, and to display the moving image captured by the image capturing unit without superimposing the first display element on the moving image captured by the image capturing unit after completion of the superimposed recording setting.

* * * * *